June 27, 1933. W. C. NABORS 1,915,864
VEHICLE TRAILER
Filed July 14, 1930 2 Sheets-Sheet 1
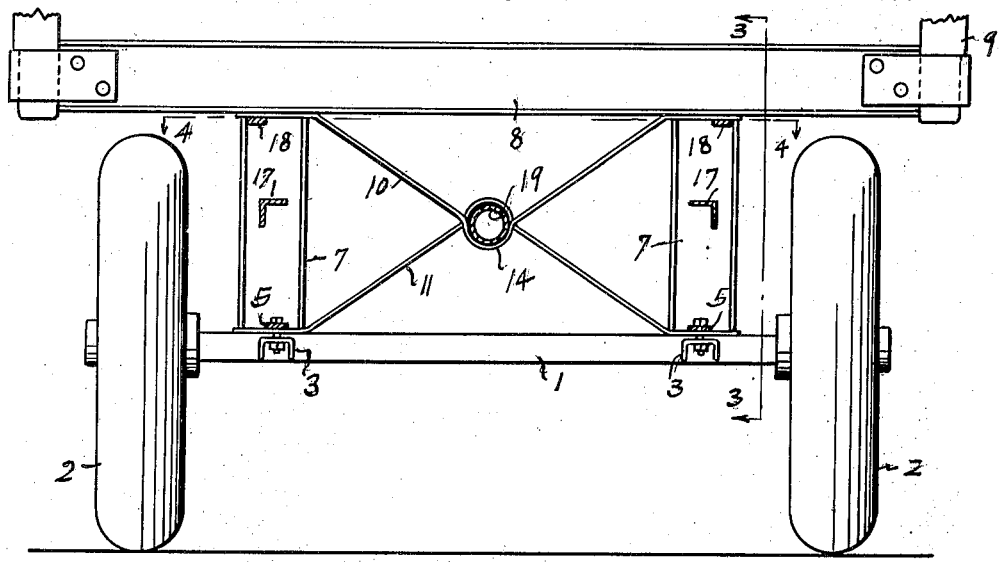
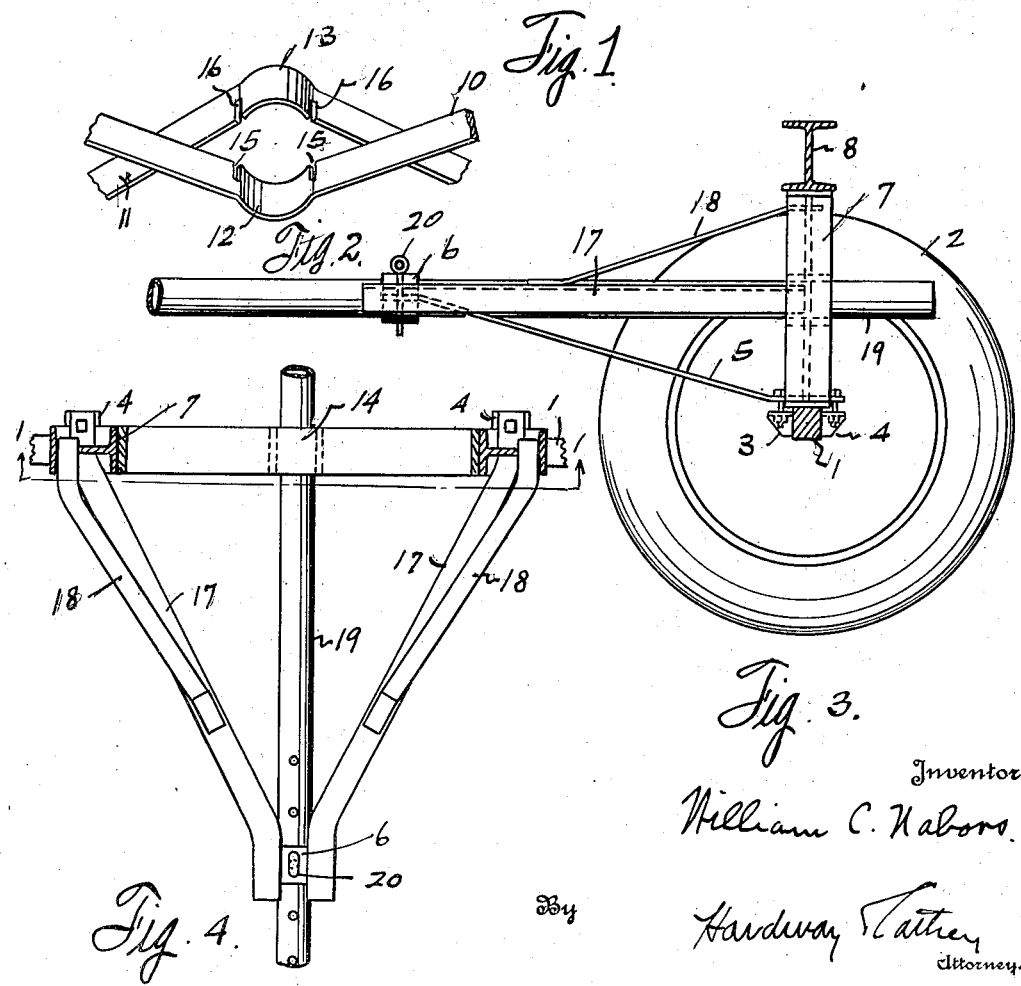
Inventor
William C. Nabors.
By
Hardway Lather
Attorneys June 27, 1933.  W. C. NABORS  1,915,864
VEHICLE TRAILER
Filed July 14, 1930    2 Sheets-Sheet 2
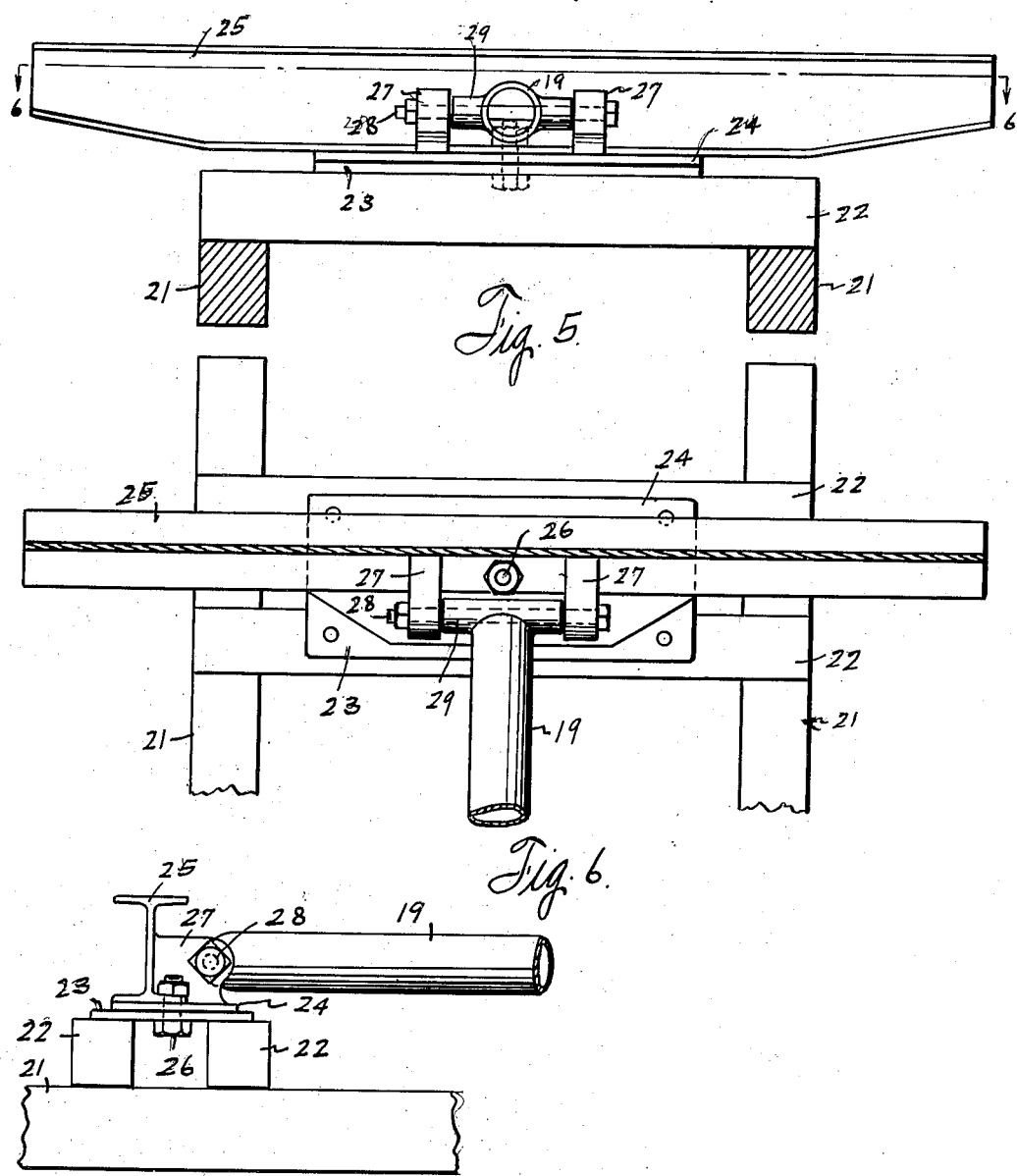

Patented June 27, 1933

1,915,864

UNITED STATES PATENT OFFICE

WILLIAM C. NABORS, OF MANSFIELD, LOUISIANA

VEHICLE TRAILER

Application filed July 14, 1930. Serial No. 467,666.

This invention relates to new and useful improvements in a vehicle trailer.

One object of the invention is to provide in a trailer of the character described, a novel type of bolster mounted on the trailer axle, with novel means for securing and bracing the bolster on said axle.

Another object of the invention is to provide in a trailer a substantial and efficient means for attaching the trailer reach pole to the truck or tractor ahead so that the reach pole of the trailer can swing both vertically and horizontally, relatively to the part of the tractor to which it is attached. A still further feature of the invention resides in the provision of an attachment of the character described which includes means for engaging with the supporting member or bolster at the rear of the tractor for cooperating with the trailer to support long loads so that the reach pole and supporting bolster will swing horizontally as a unit about the same vertical axis and therefore the load that is partly supported on the trailer bolster and partly on the load supporting member or bolster at the rear of the tractor will be securely supported in a uniform manner irrespective of the angular relation of the longitudinal axis of the reach pole to the longitudinal axis of the tractor as well as when the trailer is moving directly in line with the tractor.

With the above and other objects in view the invention has particular relation to certain novel features of construction, arrangement of parts and use, an example of which is given in this specification and illustrated in the accompanying drawings wherein:—

Figure 1 shows a vertical sectional view of the trailer taken on the line 1—1 of Figure 4.

Figure 2 shows a fragmentary perspective view of the brace bars employed as unassembled.

Figure 3 shows a vertical sectional view taken on the line 3—3 of Figure 1.

Figure 4 shows a horizontal sectional view taken on the line 4—4 of Figure 1.

Figure 5 shows a rear end view of the tractor, showing the side members in section.

Figure 6 shows a fragmentary horizontal sectional view taken on the line 6—6 of Figure 5, and Figure 7 shows a fragmentary side view of the tractor showing the reach pole connected thereto.

In the drawings, the numeral 1 designates the axle of the trailer which is supported by the ground wheels 2, 2. The trailer axle has the front bracket 3, 3 and the rear brackets 4, 4 welded to said axle, and the rear ends of the lower brace bars 5, 5 extend across the axle and are bolted to said front and rear brackets. The forward end of these brace bars 5 converge and are welded to the bearing sleeve 6 or otherwise suitably secured thereto. Mounted on and secured to the axle preferably by welding the same thereto there are the upstanding legs 7, 7 preferably formed of I-beams. Mounted on these legs, and preferably welded thereto, there is the trailer bolster 8, also preferably formed of an I-beam and having the end standards 9, 9 upstanding from the ends thereof to retain the load. There are the upper and lower brace bars 10, 11, having the complemental confronting arcuate sections 12, 13 which when assembled form the reach pole bearing 14. The ends of the bar 10 are fitted between the bolster and the upper ends of the legs 7 and the ends of the bar 11 are fitted between the axle and the lower ends of the legs 7 and these adjacent parts are all welded together. The bar 10 has the side notches 15, 15 and the bar 11 has similar side notches 16, 16 opposite the notches 15 so that these opposing parts may be brought into intermeshing relation and moulded together, to form the complete bearing 14 and the bars thus, in effect extending diagonally, form braces to brace the parts together and to brace the bolster against lateral movement on the axle 1.

The trailer frame has the side members 17, 17 preferably formed of angle iron, whose rear ends are welded to the respective legs 7, and whose forward ends converge and are welded to the bearing sleeve 6 and there are additional upper braces 18, 18 whose rear ends are welded to the upper ends of the legs 7 and whose forward ends converge and are welded to the side members 17.

The numeral 19 designates the reach pole whose rear end works through the bearing sleeve 6 and the bearing 14 and is secured therein by means of a linch pin 20 which is fitted through the bearings in the sleeve 6 and in said reach pole.

The numerals 21, 21 designate side members of the frame work, of a truck, or tractor, and whose rear ends support the cross beams 22, 22. Secured on these cross beams is the lower bearing plate 23 and superimposed on this bearing plate there is an upper bearing plate 24 on which the rear bolster 25 of the tractor is secured. This bolster is preferably formed of a suitable I-beam, and it pivots on a vertical axis about the king pin 26 which is fitted through aligned bearings in the plates 23, 24 and in the rear flange of the bolster 25.

There are the ears 27, 27 which are welded to the rear side of the bolster 25, and to the top of the upper plate 24 and are provided with transversely aligned bearings to receive the bearing pin 28. Welded to the forward end of the reach pole there is a transverse bearing 29 which fits snugly between the ears 27 and through which the pin 28 extends, and the forward end of the reach pole is thus attached to the tractor, the connections described being such as to permit said pole to swing about a vertical axis as well as a horizontal axis relatively to the tractor framework.

The drawings and description disclose what is now considered to be a preferred form of the invention by way of illustration only, while the broad principle of the invention will be defined by the appended claims.

What I claim is:

1. A trailer comprising an axle, ground wheels supporting the axle, a load supporting structure formed of a bolster, and end legs upstanding from the axle and supporting the bolster, cross braces between the legs whose ends are anchored to the bolster and axle, respectively, complemental portions of said braces being formed into a reach pole bearing.

2. A trailer comprising an axle, ground wheels supporting the axle, a load supporting structure formed of a bolster, and end legs upstanding from the axle and supporting the bolster, cross braces between the legs whose ends are anchored to said supporting structure, complemental portions of said braces being welded together and formed into a reach pole bearing.

3. A trailer comprising an axle, ground wheels supporting the axle, a load supporting structure formed of a bolster, and end legs upstanding from the axle and supporting the bolster, braces whose ends are anchored to said structure and intermediate portions of which are formed into a reach pole bearing, a bearing sleeve aligned with said bearing and forwardly converging frame members anchored at their rear ends to said structure and at their forward ends to said sleeve.

4. A trailer comprising an axle, ground wheels supporting the axle, a load supporting structure formed of a bolster and end legs upstanding from the axle and supporting the bolster, cross braces whose ends are anchored to said structure and intermediate, complemental, portions of which are welded together and formed into a reach pole bearing, a bearing sleeve aligned with said bearing and forwardly converging frame members anchored to said structure and whose forward ends are anchored to said sleeve.

In testimony whereof I have signed my name to this specification.

WILLIAM C. NABORS.